US012613174B2

(12) United States Patent
Fang et al.

(10) Patent No.: US 12,613,174 B2
(45) Date of Patent: Apr. 28, 2026

(54) DEVICE FOR DETECTING SLUDGE MOISTURE CONTENT BASED ON DENSITY AND DETECTION METHOD THEREOF

(71) Applicant: Shanghai Investigation, Design & Research Institute Co., Ltd., Shanghai (CN)

(72) Inventors: Ning Fang, Shanghai (CN); Wenqing Wu, Shanghai (CN); Yali Guo, Shanghai (CN); Haibin Wu, Shanghai (CN); Bin Dong, Shanghai (CN); Danni Shen, Shanghai (CN); Huan Jiang, Shanghai (CN)

(73) Assignee: Shanghai Investigation, Design & Research Institute Co., Ltd., Shanghai (CN)

( * ) Notice: Subject to any disclaimer, the term of this patent is extended or adjusted under 35 U.S.C. 154(b) by 347 days.

(21) Appl. No.: 18/396,770

(22) Filed: Dec. 27, 2023

(65) Prior Publication Data

US 2024/0410804 A1      Dec. 12, 2024

Related U.S. Application Data

(63) Continuation of application No. PCT/CN2023/119511, filed on Sep. 18, 2023.

(30) Foreign Application Priority Data

Jun. 6, 2023     (CN) .......................... 202310661106.5

(51) Int. Cl.
*G01N 9/36*          (2006.01)
*G01N 9/02*          (2006.01)

(52) U.S. Cl.
CPC ................. *G01N 9/36* (2013.01); *G01N 9/02* (2013.01); *G01N 2009/024* (2013.01)

(58) Field of Classification Search
CPC ....... G01N 9/36; G01N 9/02; G01N 2009/024
See application file for complete search history.

(56) References Cited

U.S. PATENT DOCUMENTS 6,107,809 A * 8/2000 Moshe ................... G01N 33/02
                                                          324/637

FOREIGN PATENT DOCUMENTS

CN          113607758 A * 11/2021 ............. G01N 22/04

* cited by examiner

*Primary Examiner* — Kristina M Deherrera
*Assistant Examiner* — Gedeon M Kidanu
(74) *Attorney, Agent, or Firm* — The Inventor's Friend Patent Law Firm, P.L.L.C.; Nathaniel A. Wickliffe

(57)                ABSTRACT

A device for detecting sludge moisture content based on density includes a detection chamber that is provided with a feeding mechanism, a compacting mechanism, a measuring mechanism, and an information processing unit. The feeding mechanism is provided on one side of the compacting mechanism, the measuring mechanism is provided on another side of the compacting mechanism, and the measuring mechanism is connected to the information processing unit. The feeding mechanism comprises a feeding base which is provided with a limited sliding block; and the limited sliding block is connected to a feeding sliding rail. The compacting mechanism comprises a feeding base, a rotating cam is provided at a lower end of the feeding base, and a hydraulic equipment is provided at an upper end of the feeding base. The measuring mechanism comprises a weighing base, and a height detecting base is provided at an upper end of the weighing base.

12 Claims, 5 Drawing Sheets

DEVICE FOR DETECTING SLUDGE MOISTURE CONTENT BASED ON DENSITY AND DETECTION METHOD THEREOF

CROSS-REFERENCE TO RELATED APPLICATIONS

This is a continuation application claiming priority to a pending PCT application PCT/CN2023/119511, filed on Sep. 18, 2023, which claims the priority to a Chinese application No. CN202310661106.5, filed on Jun. 6, 2023, both of which are hereby incorporated by reference in their entireties, including any appendices or attachments thereof, for all purpose.

FIELD OF THE INVENTION

The present disclosure relates to the technical field of detecting sludge moisture content, particularly to a device for detecting sludge moisture content based on density and a detection method thereof.

BACKGROUND OF THE INVENTION

The national sludge production has been increasing year by year, posing significant challenges for disposal. Sludge dehydration and drying are important measures to achieve sludge reduction, and various sludge treatment and disposal methods have certain requirements for moisture content. Therefore, sludge moisture content is related to whether sludge treatment and disposal meet standards, and is an important detection indicator in this field.

Currently, the main measurement methods of sludge moisture content include a weighing method, a microwave method, and a near-infrared measurement method. The weighing method needs to dry the sludge, which takes a long time; the microwave method needs to establish a relationship between dielectric constant and moisture content, and the near-infrared measurement method needs to establish a relationship between wavelength and moisture content, which are complicated and have high equipment costs. In addition, a probe-based measurement method is also in use, which has a narrow measurement range and low accuracy.

SUMMARY OF THE INVENTION

The present disclosure provides a device for detecting sludge moisture content based on density and a detection method thereof. A compacting mechanism is used to compact the sludge in a feeding unit to expel air bubbles and flatten the surface of the sludge. A measuring mechanism is used to measure the volume and mass of the compacted sludge sample and then transfer the measured data to an information processing unit. The information processing unit calculates the sludge moisture content according to a preset calculation formula and transmits the results to a data display and storage unit. The data display and storage unit includes a recording chip and a display screen, where the recording chip is used to store the data and the display screen can display the data.

The present disclosure provides the following technical solution.

A device for detecting sludge moisture content based on density, including a detection chamber, where the detection chamber is provided with a feeding mechanism, a compacting mechanism, a measuring mechanism, and an information processing unit. The feeding mechanism is provided on one side of the compacting mechanism, the measuring mechanism is provided on another side of the compacting mechanism, and the measuring mechanism is connected to the information processing unit. The feeding mechanism includes a first feeding base which is provided with a limited sliding block, where a groove is provided at a bottom of the limited sliding block, and the limited sliding block is connected to a first feeding sliding rail that is on the same side as the feeding mechanism to compacting mechanism. The compacting mechanism includes a second feeding base including a front base and a rear base, where a height-adjustable base is arranged between the front base and the rear base, and a second feeding sliding rail is symmetrically arranged from a front end to a rear end of the height-adjustable base. A rotating cam is provided at a lower end of the second feeding base, a hydraulic equipment is provided at an upper end of the second feeding base, and the second feeding base is on the same side as the compacting mechanism to the measuring mechanism. The measuring mechanism includes a weighing base, and a height detecting base is provided at an upper end of the weighing base.

Preferably, the information processing unit includes a data display unit and an information storage unit, the data display unit is connected to the measuring mechanism, and the information storage unit is also connected to the measuring mechanism.

Preferably, a weighing base is mounted on a third feeding base which is on one side of the second feeding base, where the weighing base is provided with a gravity sensor, and an infrared-transmitting-and-receiving device is provided above the gravity sensor. The infrared-transmitting-and-receiving device is mounted on an upper wall of the detecting chamber within the detecting chamber, and a third feeding sliding rail is provided on the third feeding base.

Preferably, the hydraulic equipment includes a hydraulic rod that is mounted on a hydraulic column, where the hydraulic rod is arranged in alignment with the second feeding base in a vertical direction. The second feeding base is provided with a corresponding sensor that is capable of identifying the position of the center of the groove.

Preferably, the groove is capable of holding a base of a measuring cylinder, where the measuring cylinder is a standard metal container, and a compressive strength of the measuring cylinder is ≥60 MPa. A buckle is provided on one side of the limited sliding block, and is used to fix the measuring cylinder.

Preferably, a corresponding base is fixedly mounted at the center of a lower end of the height-adjustable base, and the corresponding base is set in correspondence with the rotating cam. The front base and the rear base are respectively provided with a sliding groove, and the sliding grooves are slidably connected to sliding rails at front and rear ends of the corresponding base. The sliding rail is vertically mounted on the front and rear walls of the corresponding base, and a limit block is arranged at a bottom of the sliding rail to confine the position of the corresponding base.

Preferably, the rotating cam is connected to a rotating rod, and the rotating rod is rotationally connected to a rotating base of the detection chamber. A rotating motor is arranged on one side of the rotating base and is fixedly mounted to a fixed base on an inner wall of the detection chamber. The fixed base is fixedly connected to the rotating base, and the rotating motor is rotationally connected to the rotating rod.

Preferably, the gravity sensor is correspondingly arranged in alignment with the infrared-transmitting-and-receiving device in a vertical direction, where the infrared-transmitting-and-receiving device is connected to the information processing unit, and the gravity sensor is also connected to the information processing unit.

Preferably, the first feeding sliding rail, second feeding sliding rail, and third feeding sliding rail are at the same horizontal level. The limited sliding block is slidably connected to the first feeding sliding rail, second feeding sliding rail, and third feeding sliding rail, respectively, through the sliding motor. A clearance is set between the first feeding base and the second feeding base, as well as between the second feeding base and the third feeding base. The sliding motor is connected to the rotating gear in the limited sliding block to drive the rotating wheel of the feeding sliding rails to rotate for realizing movement.

A detection method by using a device for detecting sludge moisture content based on density, including the following steps:

S1: placing to-be-measured sludge in a measuring cylinder; placing the measuring cylinder in a groove of a limited sliding block; transferring the limited sliding block from a first feeding base to a second feeding base by a sliding motor; driving a height-adjustable base on the second feeding base to move upwardly and downwardly by rotation of a rotating cam, where a rotating motor drives a rotating rod to rotate and the rotating rod drives the rotating cam to rotate, so that the to-be-measured sludge in the measuring cylinder is compacted and bubbles in the to-be-measured sludge are removed during a compacting process;

S2: after the compacting is completed, pressing the to-be-measured sludge in the measuring cylinder with a hydraulic rod of a hydraulic equipment, so that a surface of the to-be-measured sludge is flattened during a pressing process; after the flattening is completed, storing an internal cross-sectional area of the measuring cylinder as S and a net weight mass of the measuring cylinder as $m_1$ based on a standard container of the measuring cylinder of the information processing unit; transferring the measuring cylinder from the second feeding base to a third feeding base by using the limited sliding block; weighing a mass of the to-be-measured sludge in the measuring cylinder as $m_2$ by using a gravity sensor on the third feeding base; calculating a net weight mass of the to-be-measured sludge as $m=m_2-m_1$ by using a data display unit and an information storage unit of the information processing unit;

S3: calculating a sludge moisture content W according to the following formula which is obtained according to a principle that when drying a sludge to obtain an ideal shrinkage, its true volume (removing an internal pore volume of sludge) can be considered as a sum of a dry base volume of sludge and a volume of water in sludge:

$$W = \frac{\dfrac{\rho_s \rho_1 V}{m} - \rho_1}{\rho_s - \rho_1}$$

where m is a measured net weight of sludge, g; V is a measured volume of sludge, $cm^3$; $\rho_s$ is a dry base density of sludge, and the dry base density of sludge is $\rho_s = -0.5 \sin(t/12\pi) + 2.6$, $g/cm^3$, where t is the month ranging from 1 to 12; $\rho_l$ is a density of water, which is 1 $g/cm^3$.

Compared with the existing technologies, the present disclosure has the following benefits.

The compacting mechanism can compact the sludge in the measuring cylinder to remove bubbles in the sludge, thus ensuring the validation of the subsequent data measurement. At the same time, the measuring cylinder is kept stable by the groove during the compacting process, which facilitates the hydraulic device to flatten the surface of the sludge. Therefore, the accuracy of the measurement of the height is guaranteed, so that all aspects of the operation can be better dealt with.

The information processing unit can update the measured information timely, which is conducive to the information process, the completion of information storage and calculation, and improves the accuracy of sludge moisture content.

Figure 1:
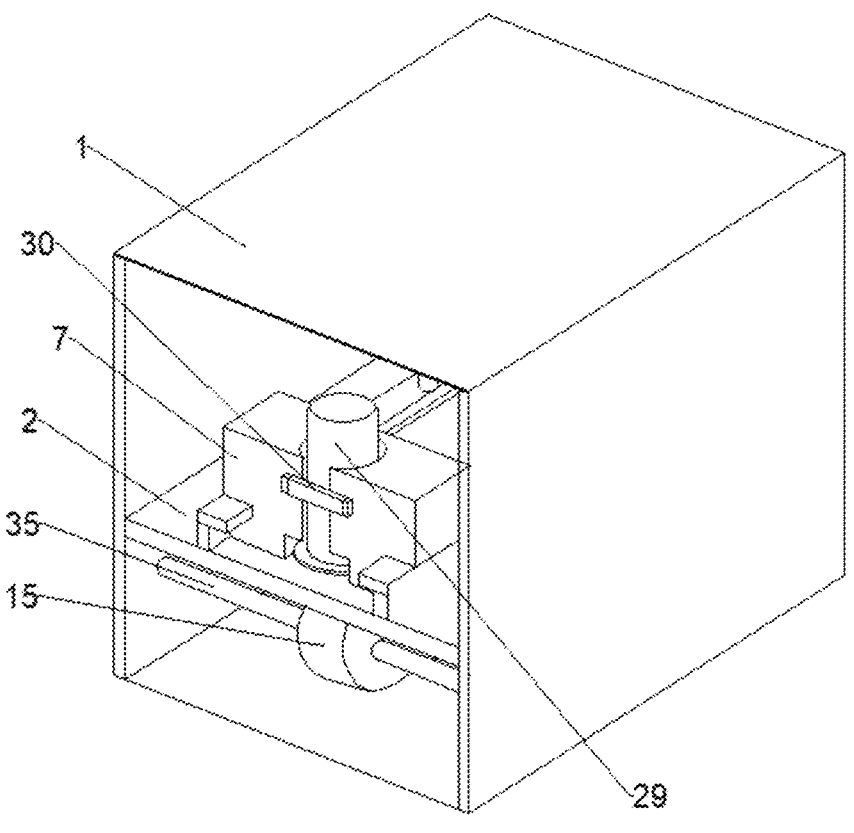
FIG. 1 shows an overall structural schematic diagram of a device for detecting sludge moisture content based on density of the present disclosure.
Figure 2:
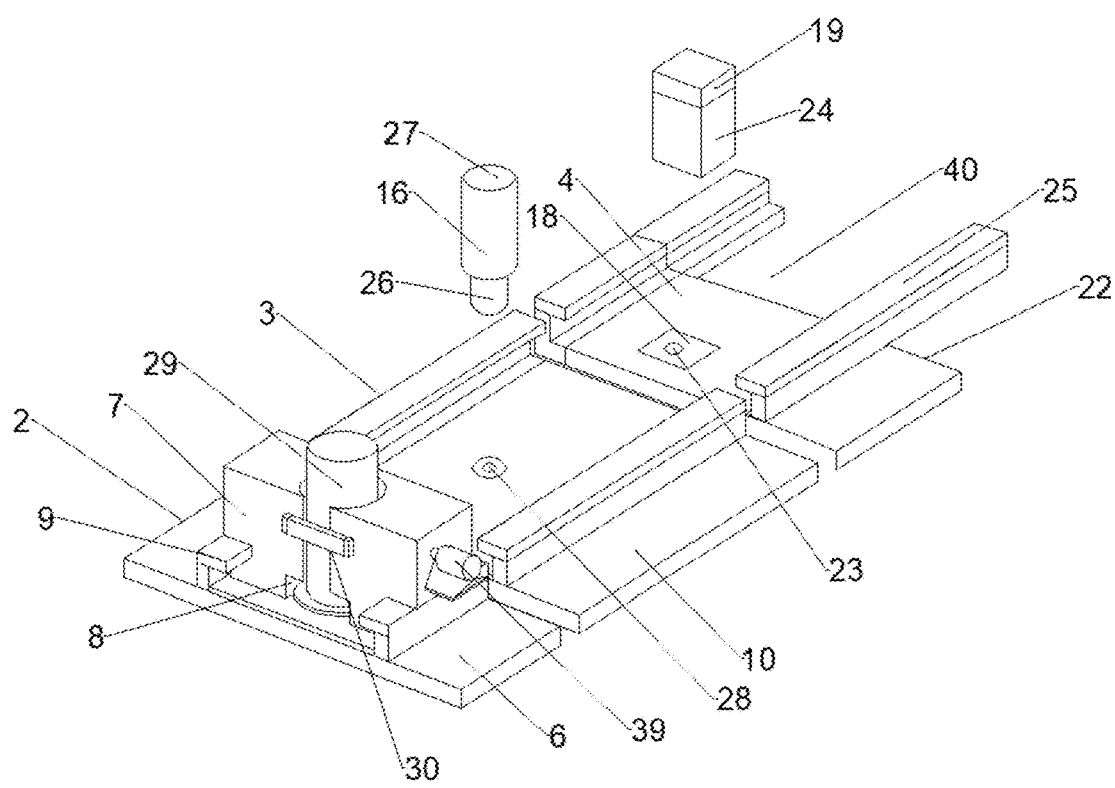
FIG. 2 shows a structural schematic diagram of a feeding mechanism, a compacting mechanism, and a measuring mechanism of the present disclosure.
Figure 3:
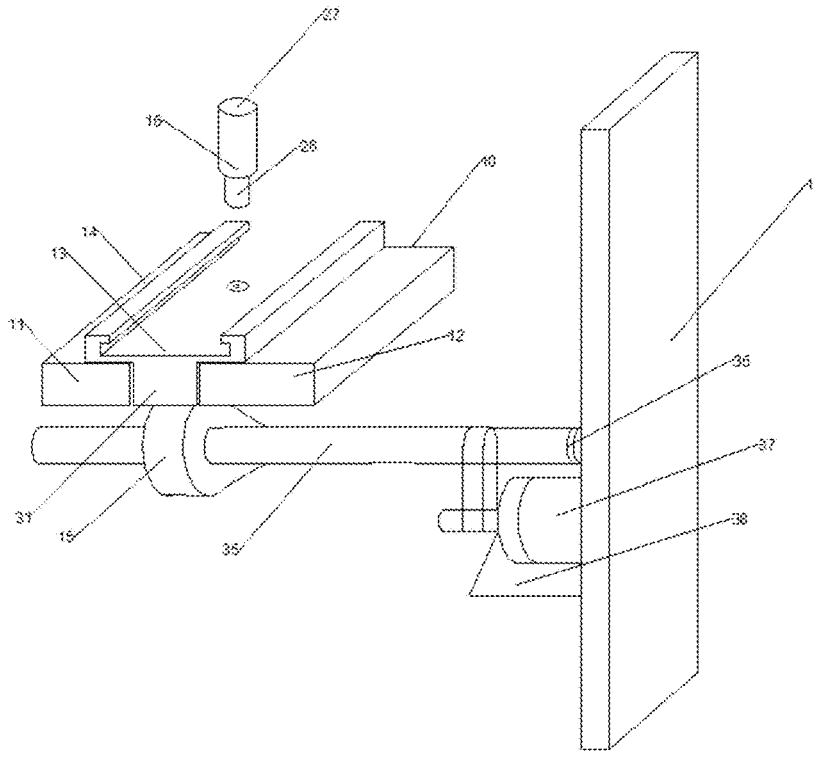
FIG. 3 shows a structural schematic diagram of a rotating cam mechanism of the present disclosure.
Figure 4:
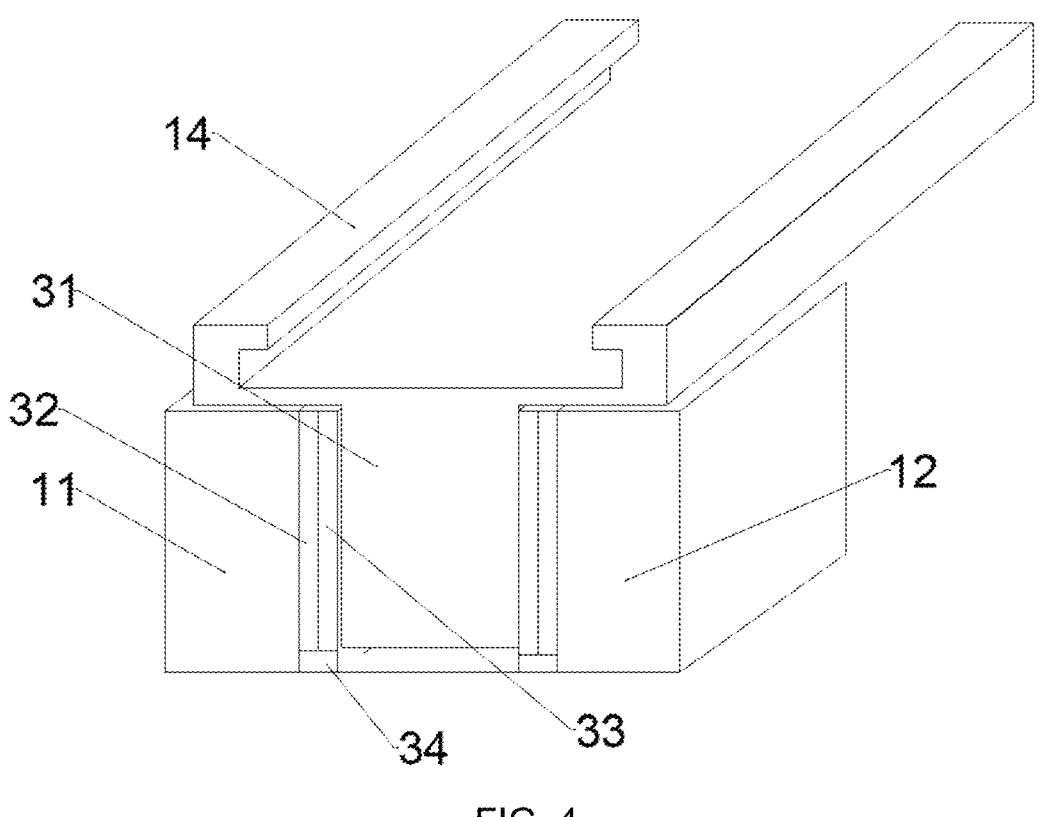
FIG. 4 shows a schematic diagram of a sliding rail structure of the present disclosure.
Figure 5:
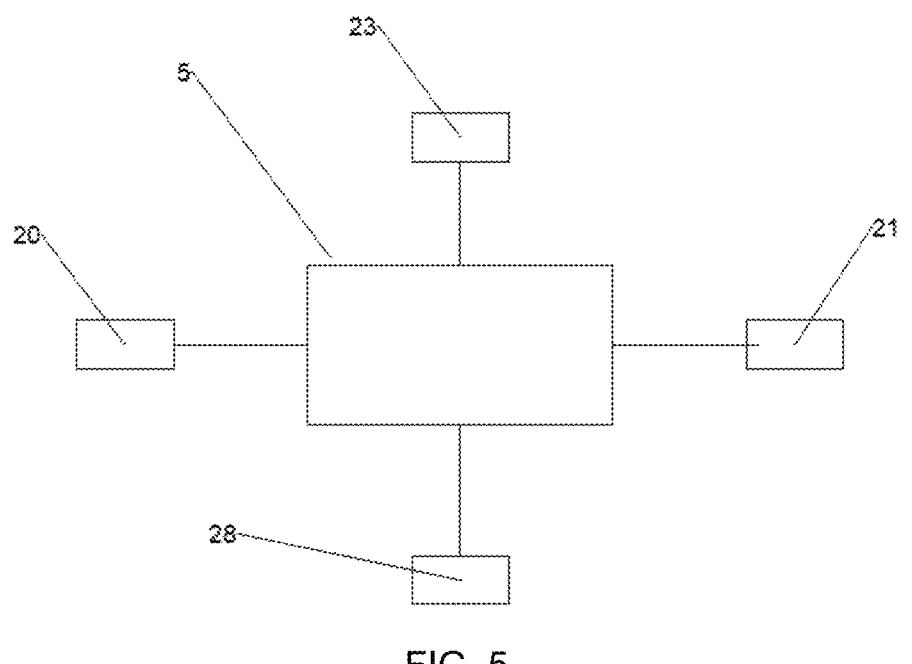
FIG. 5 shows a structural schematic diagram of an information processing unit of the present disclosure.
Figure 6:
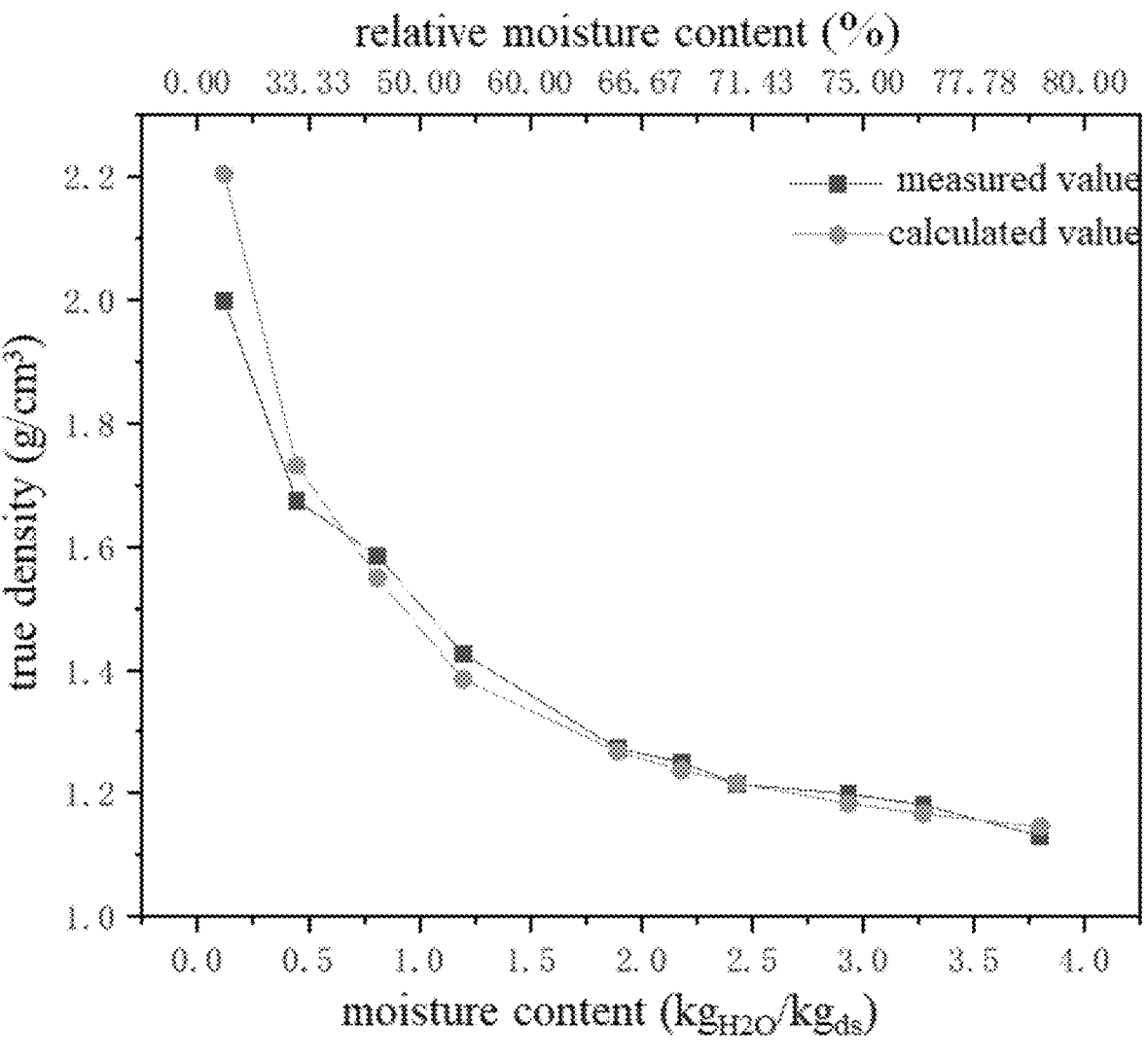
FIG. 6 shows a comparison of the calculated sludge moisture content obtained from the formula and the measured sludge moisture content of the present disclosure.

| Reference Numerals | | | |
|---|---|---|---|
| 1 | detection chamber | 2 | feeding mechanism |
| 3 | compacting mechanism | 4 | measuring mechanism |
| 5 | information processing unit | 6 | first feeding base |
| 7 | limited sliding block | 8 | groove |
| 9 | first feeding sliding rail | 10 | second feeding base |
| 11 | front base | 12 | rear base |
| 13 | height-adjustable base | 14 | second feeding sliding rail |
| 15 | rotating cam | 16 | hydraulic equipment |
| | | 18 | weighing base |
| 19 | height detecting base | 20 | data display unit |
| 21 | information storage unit | 22 | third feeding base |
| 23 | gravity sensor | 24 | infrared-transmitting-and-receiving device |
| 25 | third feeding sliding rail | 26 | hydraulic rod |
| 27 | hydraulic column | 28 | corresponding sensor |
| 29 | measuring cylinder | 30 | buckle |
| 31 | corresponding base | 32 | sliding groove |
| 33 | sliding rail | 34 | limit block |
| 35 | rotating rod | 36 | rotating base |
| 37 | rotating motor | 38 | fixed base |
| 39 | sliding motor | 40 | dropping groove |

DETAILED DESCRIPTION OF THE INVENTION

The following provides a detailed description of specific embodiments of the present disclosure in conjunction with the accompanying drawings.

Embodiment 1

The present disclosure provides a device for detecting sludge moisture content, including a detection chamber 1. A feeding mechanism 2, a compacting mechanism 3, a measuring mechanism 4, and an information processing unit 5 are provided in the detection chamber 1. The feeding mechanism 2 is arranged on one side of the compacting mechanism 3, the measuring mechanism 4 is arranged on another side of the compacting mechanism 3, and the measuring mechanism 4 is connected to the information processing unit 5. The feeding mechanism 2 includes a first feeding base 6, where a limited sliding block 7 is arranged on the first feeding base 6. The limited sliding block 7 is provided with a groove 8 at the bottom, and is connected to the first feeding sliding rail 9. The first feeding sliding rail 9 is arranged on the same side as the feeding mechanism 2 with respect to the compacting mechanism 3. The compacting mechanism 3 includes the second feeding base 10, where the second feeding base 10 includes a front base 11 and a rear base 12, and a height-adjustable base 13 is provided between the front base 11 and the rear base 12. The height-adjustable base 13 is symmetrically provided with a second feeding sliding rail 14 from the front end to the rear end. A rotating cam 15 is provided at a lower end of the second feeding base 10, and a hydraulic equipment 16 is provided at an upper end of the second feeding base 10. The measuring mechanism 4 is arranged on a side of the second feeding base 10 and includes a weighing base 18. A height measuring base 19 is provided at an upper end of the weighing base 18. The compacting mechanism 3 can compact the sludge in the measuring cylinder to remove the bubbles in the sludge, thus ensuring the validation of the subsequent measured data. In addition, the measuring cylinder can remain stable during the compacting process through the groove 8, so that the effect of compacting is improved and the subsequent hydraulic equipment can better flatten the sludge, thereby improving the accuracy of measured data, such as measured height, and dealing well with all aspects of the operation.

Preferably, the information processing unit 5 includes a data display unit 20 and an information storage unit 21. The data display unit 20 is connected to the measuring mechanism 4, and the information storage unit 21 is also connected to the measuring mechanism 4. By using the information processing unit 5, it is possible to timely update the measured information, which achieves more timely information processing, better completion of information storage and calculation, and more accurate measurement of moisture content.

Preferably, the weighing base 18 is mounted on the third feeding base 22 which is arranged on one side to the second feeding base 10. The weighing base 18 is provided with a gravity sensor 23, and an infrared-transmitting-and-receiving device 24 is provided above the gravity sensor 23. The infrared-transmitting-and-receiving device 24 is mounted on an upper wall of the detection chamber 1 within the detection chamber 1. The third feeding base 22 is provided with a third feeding sliding rail 25. The weighing base 18 is capable of compacting and flattening the material to obtain an accurate mass.

Preferably, the hydraulic equipment 16 includes a hydraulic rod 26 which is mounted on a hydraulic column 27. The hydraulic rod 26 is arranged in alignment with the second feeding base 10 in a vertical direction. The second feeding base 10 is provided with a corresponding sensor 28 that is capable of identifying the position of the center of the groove 8.

Preferably, the groove 8 is capable of holding the base of the measuring cylinder 29. The measuring cylinder 29 is a standard metal container with a compressive strength of ≥60 MPa. The limited sliding block 7 is provided with a buckle 30 on the other side for fixing the measuring cylinder 29. The measuring cylinder 29 is fixed in the limited sliding block 7 through the buckle 30, so that the limited sliding block 7 can drive the measuring cylinder 29 to move and ensure the stability of the measuring cylinder 29, thus the measuring cylinder 29 can better pass through the first feeding base 6, the second feeding base 10, and the third feeding base 22. A dropping groove 40 is arranged on a side of the third feeding base, and the width of the dropping groove 40 is larger than the diameter of the base of the measuring cylinder 29.

Preferably, a corresponding base 31 is fixedly mounted at the center of the lower end of the height-adjustable base 13. The corresponding base 31 is set in correspondence with the rotating cam 15. The front base 11 and the rear base 12 are each provided with a sliding groove 32, and the sliding grooves 32 are slidably connected to the sliding rails 33 at the front and rear ends of the corresponding base 31, where the sliding rails 33 are vertically mounted on the front and rear walls of the corresponding base 31. One or more limit blocks 34 are arranged at the bottom of the sliding rails 33 and are used to confine the position of the corresponding base.

Preferably, the rotating cam 15 is connected to a rotating rod 35, and the rotating rod 35 is rotationally connected to a rotating base 36 of the detection chamber 1. A rotating motor 37 is arranged on one side of the rotating base 36 and is fixedly mounted to a fixed base 38 on the inner wall of the detection chamber 1. The fixed base 38 is fixedly connected to the rotating base 36, and the rotating motor 37 is rotationally connected to the rotating rod 35.

Preferably, the gravity sensor 23 is correspondingly arranged in alignment with the infrared-transmitting-and-receiving device 24 in a vertical direction. The infrared-transmitting-and-receiving device 24 is connected to the information processing unit 25, and the gravity sensor 23 is also connected to the information processing unit 25.

Preferably, the first feeding sliding rail 9, second feeding sliding rail 14, and third feeding sliding rail 25 are at the same horizontal level. The limited sliding block 7 is slidably connected to the first feeding sliding rail 9, second feeding sliding rail 14, and third feeding sliding rail 25, respectively, through the sliding motor 39. The clearance is set between the first feeding base 6 and the second feeding base 10, as well as between the second feeding base 10 and the third feeding base 22. The sliding motor is connected to the rotating gear in the limited sliding block to drive the rotating wheels of the feeding sliding rails to rotate for realizing movement.

The present disclosure further provides a detection method by using the device for detecting sludge moisture content based on density. The detection method includes the following steps:

S1: placing to-be-measured sludge in the measuring cylinder 29; placing the measuring cylinder 29 in the groove 8 of the limited sliding block 7; transferring the limited sliding block 7 from the first feeding base 6 to the second feeding base 10 by the sliding motor 39; driving the height-adjustable base 13 to move upwardly and downwardly by rotation of the rotating cam 15, where the rotating motor 37 drives the rotating rod 35 to rotate and the rotating rod 35 drives the rotating cam 15 at a lower end of the height-adjustable base 13 to rotate, so that the sludge in the measuring cylinder 29 is compacted and bubbles in the sludge are removed during the compacting process;

S2: after the compacting is completed, flattening the sludge in the measuring cylinder 29 with the hydraulic rod 26 of the hydraulic equipment 16, so that the sludge surface is flattened during the pressing process; after flattening the sludge surface, storing an internal cross-sectional area of the measuring cylinder 29 as S and a net weight mass of the measuring cylinder 29 as $m_1$ based on the standard container of the measuring cylinder of the information processing unit 5; transferring the measuring cylinder 29 from the second feeding base 10 to the third feeding base 22 by using the limited sliding block; weighing the mass of the sludge in the measuring cylinder 29 as $m_2$ by using the gravity sensor 23 on the third feeding base 22; calculating the net weight mass of the sludge as $m=m_2-m_1$ by using the data display unit and the information storage unit of the information processing unit;

S3: calculating a sludge moisture content W according to the following formula which is obtained according to a principle that the volume V of wet sludge is equal to the sum of the dry base volume of the sludge and the volume of water:

$$W = \frac{\frac{\rho_s \rho_1 V}{m} - \rho_1}{\rho_s - \rho_1},$$

where m is the measured net weight of sludge, g; V is the measured volume of sludge, $cm^3$; $\rho_s$ is the dry base density of the sludge, and the dry base density of the sludge is $\rho_s = -0.5 \sin(t/12\pi)+2.6$, $g/cm^3$, where t is the month ranging from 1 to 12; $\rho_l$ is the density of water, which is 1 $g/cm^3$.

Specifically, the above principle that the volume V of wet sludge is equal to the sum of the dry base volume of the sludge and the volume of water is obtained according to the linear shrinkage characteristic of the sludge at which the organic matter content of the sludge is above 35% and the moisture content is between 40% (the dry base moisture content is 0.67 $kg_{H2O}/kg_{DS}$) and 80% (the dry base moisture content is 4 $kg_{H2O}/kg_{DS}$). At this time, the reduction of the non-porous volume of the sludge equals the reduction of volume of water in the sludge, that is, the non-porous volume of the sludge is the sum of the dry base volume of the sludge and the volume of water, and the mass of the sludge is the sum of the dry base mass of the sludge and the mass of water. The corresponding equations (1) and (2) are shown in the following, respectively.

$$V = V_s + V_1, \qquad (1)$$

where V is the non-porous volume, $m^3$; Vs is the dry base volume of the sludge, $m^3$; and $V_1$ is the volume of water, $m^3$.

$$m = m_s + m_1 = \rho_s V_s + \rho_1 V_1, \qquad (2)$$

where $\rho_s$ and $\rho_l$ are the true density of absolute dry sludge and the density of water, respectively, $kg/m^3$; $m_s$ and $m_l$ are the dry base mass of the sludge and the mass of water, respectively, kg.

Further, based on the following equation (3) and the aforementioned equations (1)-(2), the equation (4) for calculating the sludge moisture content W can be obtained.

$$W = \frac{m_1}{m_s}. \qquad (3)$$

$$W = \frac{\frac{\rho_s \rho_1 V}{m} - \rho_1}{\rho_s - \rho_1}. \qquad (4)$$

The sludge in the present disclosure may be any sludge that is known in the field, including but not limited to river and lake sludge, municipal sludge, sewage sludge. Furthermore, the present disclosure is applicable not only to sludge, but also to solid materials having linear shrinkage characteristics, for example, engineering slurries, various types of soils, fertilizers, anaerobic digestion residues, and the like. The moisture content of the solid materials can be calculated according to equation (4) by simply measuring the true density of the dry base solid material, which verifies the application of the present disclosure to the solid materials.

Figure 7:
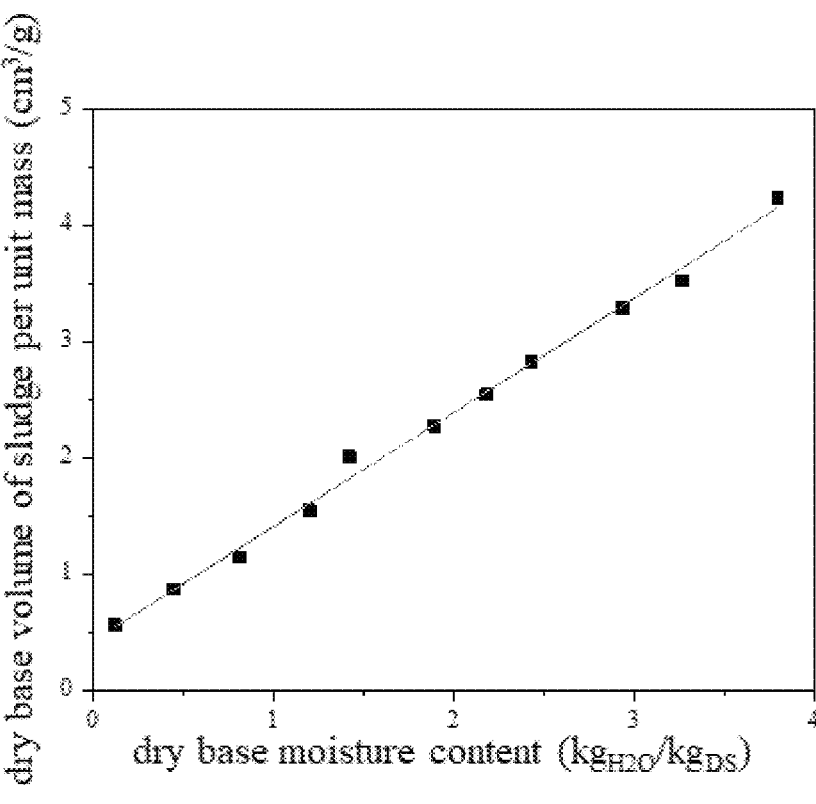
FIG. 7 shows a linear shrinkage characteristics curve of the present disclosure.

Furthermore, the present disclosure also provides a criterion for judging the linear shrinkage characteristic that applies not only to the sludge but also to the solid material. Taking sludge as an example, collecting at least five dry base sludge volumes and five dry base moisture contents per unit mass under different moisture contents, and when the dry base sludge volume and the dry base moisture content per unit mass show a linear distribution ($R^2 > 95\%$) (as shown in FIG. 7), the sludge can be determined to possess the linear shrinkage characteristic.

The above is only a preferred embodiment of the present disclosure, and it should be noted that multiple improvements and substitutions made by those skilled in the art without departing from the technical principles of the present disclosure are considered to be within the scope of protection of the present disclosure.

The invention claimed is:

1. A device for detecting sludge moisture content based on density, comprising a detection chamber, wherein the detection chamber is provided with a feeding mechanism, a compacting mechanism, a measuring mechanism, and an information processing unit, wherein the feeding mechanism is provided on one side of the compacting mechanism, the measuring mechanism is provided on another side of the compacting mechanism, and the measuring mechanism is connected to the information processing unit;

wherein the feeding mechanism comprises a first feeding base that is provided with a limited sliding block, wherein a groove is provided at a bottom of the limited sliding block, and the limited sliding block is connected to a first feeding sliding rail that is on the same side as the feeding mechanism to the compacting mechanism;

wherein the compacting mechanism comprises a second feeding base including a front base and a rear base, a height-adjustable base is arranged between the front base and the rear base, and a second feeding sliding rail is symmetrically arranged from a front end to a rear end of the height-adjustable base, wherein a rotating cam is provided at a lower end of the second feeding base, a hydraulic equipment is provided at an upper end of the second feeding base, and the second feeding base is on the same side as the compacting mechanism to the measuring mechanism; and wherein the measuring mechanism comprises a weighing base, and a height detecting base is provided at an upper end of the weighing base.

2. The device for detecting sludge moisture content based on density according to claim 1, wherein the information processing unit comprises a data display unit and an information storage unit, the data display unit is connected to the measuring mechanism, and the information storage unit is also connected to the measuring mechanism.

3. The device for detecting sludge moisture content based on density according to claim 2, wherein the weighing base is mounted on a third feeding base which is on one side of the second feeding base, wherein the weighing base is provided with a gravity sensor, and an infrared-transmitting-and-receiving device is provided above the gravity sensor;

wherein the infrared-transmitting-and-receiving device is mounted on an upper wall of the detecting chamber within the detecting chamber, and a third feeding sliding rail is provided on the third feeding base.

4. The device for detecting sludge moisture content based on density according to claim 3, wherein the hydraulic equipment comprises a hydraulic rod which is mounted on a hydraulic column, wherein the hydraulic rod is arranged in alignment with the second feeding base in a vertical direction, wherein the second feeding base is provided with a corresponding sensor that is capable of identifying a position of the center of the groove.

5. The device for detecting sludge moisture content based on density according to claim 4, wherein the groove is capable of holding a base of a measuring cylinder, wherein the measuring cylinder is a standard metal container, and a compressive strength of the measuring cylinder is $\geq 60$ MPa, wherein a buckle is provided on one side of the limited sliding block, and is used to fix the measuring cylinder.

6. The device for detecting sludge moisture content based on density according to claim 3, wherein a corresponding base is fixedly mounted at the center of a lower end of the height-adjustable base, and the corresponding base is set in correspondence with the rotating cam, wherein the front base and the rear base are respectively provided with a sliding groove, and the sliding grooves are slidably connected to sliding rails at front and rear ends of the corresponding base, wherein the sliding rail is vertically mounted on the front and rear walls of the corresponding base, and wherein a limit block is arranged at a bottom of the sliding rail to confine a position of the corresponding base.

7. The device for detecting sludge moisture content based on density according to claim 1, wherein the rotating cam is connected to a rotating rod, and the rotating rod is rotationally connected to a rotating base of the detection chamber;

wherein a rotating motor is arranged on one side of the rotating base and is fixedly mounted to a fixed base on an inner wall of the detection chamber, and wherein the fixed base is fixedly connected to the rotating base, and the rotating motor is rotationally connected to the rotating rod.

8. The device for detecting sludge moisture content based on density according to claim 5, wherein the gravity sensor is correspondingly arranged in alignment with the infrared-transmitting-and-receiving device in a vertical direction, wherein the infrared-transmitting-and-receiving device is connected to the information processing unit, and the gravity sensor is also connected to the information processing unit.

9. The device for detecting sludge moisture content based on density according to claim 3, wherein the first feeding sliding rail, second feeding sliding rail, and third feeding sliding rail are at the same horizontal level, wherein the limited sliding block is slidably connected to the first feeding sliding rail, second feeding sliding rail, and third feeding sliding rail, respectively, through the sliding motor, and wherein a clearance is set between the first feeding base and the second feeding base, as well as between the second feeding base and the third feeding base.

10. The device for detecting sludge moisture content based on density according to claim 1, wherein the sludge comprises river and lake sludge, municipal sludge, and sewage sludge;

wherein the device is applicable to a solid material with linear shrinkage characteristics; and the solid material with the linear shrinkage characteristics comprises engineering slurries, soils, fertilizers, and anaerobic digestion residues.

11. A detection method by using the device for detecting sludge moisture content based on density according to claim 1, comprising:

S1: placing to-be-measured sludge in a measuring cylinder;

placing the measuring cylinder in a groove of a limited sliding block;

transferring the limited sliding block from a first feeding base to a second feeding base by a sliding motor;

driving a height-adjustable base on the second feeding base to move upwardly and downwardly by rotation of a rotating cam, wherein a rotating motor drives a rotating rod to rotate and the rotating rod drives the rotating cam to rotate, so that the to-be-measured sludge in the measuring cylinder is compacted and bubbles in the to-be-measured sludge are removed during a compacting process;

S2: after the compacting is completed, flattening the to-be-measured sludge in the measuring cylinder with a hydraulic rod of a hydraulic equipment, so that a surface of the to-be-measured sludge is flattened during a pressing process;

after the flattening is completed, storing an internal cross-sectional area of the measuring cylinder as S and a net weight mass of the measuring cylinder as $m_1$ based on a standard container of the measuring cylinder of the information processing unit;

transferring the measuring cylinder from the second feeding base to a third feeding base by using the limited sliding block; weighing a mass of the to-be-measured sludge in the measuring cylinder as $m_2$ by using a gravity sensor on the third feeding base;

calculating a net weight mass of the to-be-measured sludge as $m=m_2-m_1$ by using a data display unit and an information storage unit of the information processing unit;

S3: calculating a sludge moisture content W according to the following formula which is obtained according to a principle that a volume V of a wet sludge is equal to the sum of a dry base volume of the sludge and a volume of water:

$$W = \frac{\dfrac{\rho_s \rho_1 V}{m} - \rho_1}{\rho_s - \rho_1}$$

wherein m is a measured net weight of sludge, g; V is a measured volume of sludge, $cm^3$; $\rho_s$ is a dry base density of sludge, and the dry base density of sludge is $\rho_s = -0.5 \sin(t/12\pi) + 2.6$, $g/cm^3$, wherein t is the month ranging from 1 to 12; $\rho_l$ is a density of water, which is 1 $g/cm^3$.

12. The detection method by using the device for detecting sludge moisture content based on density according to claim 11, wherein the sludge comprises river and lake sludge, municipal sludge, and sewage sludge,
wherein the detection method is applicable to a solid material with linear shrinkage characteristics; and the solid material with the linear shrinkage characteristics comprises engineering slurries, soils, fertilizers, and anaerobic digestion residues.

\* \* \* \* \*